3,004,953
Patented Oct. 17, 1961

3,004,953
REACTION PRODUCTS OF PHENOLS AND DIISOPROPENYLBENZENE

Lawrence F. Sonnabend, Midland, Mich., assignor to The Dow Chemical Company, Midland, Mich., a corporation of Delaware
No Drawing. Filed Mar. 2, 1959, Ser. No. 796,276
6 Claims. (Cl. 260—62)

This invention concerns resinous polymeric products of diisopropenylbenzene and a phenol, which products are substantially non-discoloring upon exposure to ultraviolet light.

Resinous condensation products of divinylbenzene and a phenol are known. They have the disadvantage that upon exposure to ultraviolet light they become highly discolored.

In accordance with this invention, it has been discovered that diisopropenylbenzene, either meta-, para-, or mixtures thereof (hereinafter referred to as DIPB) can be heat-reacted with a phenol at temperatures between about 60° and 125° C., preferably between about 60° and 100° C., in proportions between about 0.8 and 1.25 moles of a phenol per mole of DIPB in the presence of an acid-reacting alkylation catalyst to give substantially non-discoloring products when exposed to ultraviolet light.

By "a phenol" is meant phenol, alkylphenols, bisphenols, alkylbisphenols and mixtures thereof having at least two available reaction sites per molecule, wherein alkyl is inclusive of 1 to 4 carbon groups. Any of the well known acid-reacting alkylation catalysts can be used in this process. Preferred catalysts are the mineral acid and other conventional acid-reacting alkylation catalysts.

In practice a quantity of a phenol from 0.8 mole and up to 1.25 mole per mole of DIPB reacts. Excess of the phenol can be used to function both as a solvent and to shift the reaction to the right in accordance with Le Chatelier's principle. The DIPB is added gradually to the phenol, the DIPB being advantageously in solution in an aromatic hydrocarbon solvent such as benzene or toluene, at a reaction temperature of about 60° to 125° C. in the presence of a catalytic amount (ca. 0.25–1 weight percent, reactants basis) of an acid-reacting alkylation catalyst. The reaction generally requires from about 2 to about 6 hours for completion. Its course may be conveniently followed by continuing viscosity determinations. Completion of the reaction is indicated when maximum viscosity is attained. Thereafter volatiles are stripped by vacuum distillation at about 0.5 to 1.0 cm. of mercury absolute at a temperature ranging up to about 225° C.

The following examples illustrate specific embodiments of this invention and the best mode contemplated by the inventor for its accomplishment. Comparisons with known products are also included.

Example 1

A quantity of 108 g. (1 mole) p-cresol and 0.6 ml. 50 percent sulfuric acid was charged into a one-liter flask equipped with a stirrer, condenser and dropping funnel. The system was heated to 66° C. and 126 g. (0.8 mole) of p-DIPB was then added over a period of two hours while maintaining the temperature at 66° to 72° C. The system was held at 75° C. for an additional 70 minutes. Six ml. of 1-normal sodium hydroxide was then added. The volatiles were stripped off under reduced pressure, final conditions being —28 inches gauge pressure and a temperature of 215° C. The product had a Durrans softening point of 77.4° C.

Example 2

A quantity of 188 g. (2 moles) phenol and 1.1 ml. 50 percent sulfuric acid was charged into a flask equipped as in Example 1. A quantity of 284 g. (1.8 moles) p-DIPB in 250 g. benzene was added dropwise while the system was maintained at 80°–100° C. Six ml. 1-normal sodium hydroxide was added to neutralize the acid catalyst. Volatiles were stripped off at about 185° C. at reduced pressure. A yield of 468.6 g. of resin having a Durrans softening point of 102° C. was obtained.

Example 3

A quantity of 188 g. (2 moles) phenol and 1.1 ml. 50 percent sulfuric acid was charged into a flask equipped as in Example 1. A quantity of 284 g. (1.8 moles) m-DIPB was added over an 80 minute period while the system was maintained at 75° to 80° C. The system was held at about 75° C. for an additional 3-hour period. A quantity of 8 ml. of 1-normal sodium hydroxide was then added and the volatiles were then stripped off by heating at 1 cm. mercury absolute pressure. A yield of 443.5 g. of resin having a Durrans softening point of 75.5° C. was obtained.

Example 4

A quanity of 126.2 g. (1.34 moles) phenol, 75 g. (0.33 mole) 4,4'-isopropylidine diphenol and 1.2 ml. 50 percent sulfuric acid was charged into a flask equipped as in Example 1. A quantity of 232 g. (1.47 moles) of p-DIPB dissolved in 200 g. of benzene was added thereto in about 2½ hours at 70° to 80° C. The system was then heated an additional three hours. A quantity of 10 ml. 1-normal sodium hydroxide was then added and the volatiles were stripped off at 197° C. and 1 cm. mercury absolute pressure. A yield of 431.2 g. of resin having a Durrans softening point of 115.5° C. was obtained.

Example 5

A conventional phenol-divinylbenzene resin was made as follows. A quantity of 1410 g. (15 moles) phenol and 3 ml. 25 percent sulfuric acid was charged in a two-liter resin flask equipped with a stirrer, condenser, thermometer and dropping funnel. The system was heated to 120° C. and 1926 g. (14.8 moles) divinylbenzene was added in about 4½ hours. A quantity of 3 ml. 20 percent sodium hydroxide was then added. Volatiles were stripped off at 188° C. under reduced pressure. A yield of 3228 g. of a prior art resin having a Durrans softening point of 74° C. was obtained.

Example 6

A conventional acid-catalyzed reaction product of phenol and formaldehyde was made by reacting 1 mole phenol and 0.825 mole formaldehyde at 95° to 100° C. for 4 hours using 1 weight percent of oxalic acid, phenol basis, as catalyst. Volatiles were taken off up to 150°

C. at atmospheric pressure then finished off at about 165° C. at less than 5 cm. mercury absolute pressure.

A 50 weight percent solution of each of the preceding six resins was made up, the first in methyl ethyl ketone, the rest in benzene. Films therefrom were cast on glass microscope slides. After drying at room temperature, the slides were exposed to ultraviolet light in a fadeometer for 220 hours. Results are given in the following table.

| Example No. | Color Before Exposure | Color After 220 Hours In Fadeometer |
|---|---|---|
| 1 | colorless | trace yellow. |
| 2 | do | Do. |
| 3 | do | Do. |
| 4 | do | Do. |
| 5 (blank) | yellow | deep yellow. |
| 6 (blank) | colorless | dark brown. |

*Example 7*

A quantity of 188 g. (2 moles) of phenol and 1.1 ml. 50 percent sulfuric acid was charged into a reaction flask and heated to 81° C., and 395 g. (2.5 mole) p-DIPB dissolved in 400 ml. benzene was added dropwise thereto over a 2¼ hour period. The temperature was maintained at about 81° C. during the addition. The reacted mass was neutralized with 15 ml. 1-normal sodium hydroxide and stripped of volatiles at 180° C. at 0.7 mm. mercury gauge pressure. The yield, 577 g., was 99 percent based on total reactants. The product had a Durrans softening point of 115.2° C. A 50 weight percent solution thereof in benzene, cast on a glass microscope slide and dried, gave a colorless film. After exposure to ultraviolet light in a fadeometer for 220 hours, the color of the film was a trace yellow.

*Example 8*

The procedure of Example 7 was repeated substituting an equal amount of m-DIPB for the p-isomer, otherwise the procedure was similar. A yield of 566 g., 97 percent based on total reactants, was obtained. The product had a Durrans softening point of 92.1° C. A 50 wt. percent solution thereof in benzene cast on a microscope slide and dried gave a colorless film. After exposure to ultraviolet light in a fadeometer for 220 hours, the color of the film was a trace yellow.

What is claimed is:

1. The polymeric heat and acid reacting alkylation catalyst catalyzed condensation product of 1 mole proportion of diisopropenylbenzene to 0.8–1.25 mole proportion of at least one phenol of the group consisting of phenol, alkylphenols, and bis-phenols having at least two available reaction sites per molecule wherein alkyl is inclusive of 1 to 4 carbon alkyl groups.

2. The produce of claim 1, wherein the reactants are p-diisopropenylbenzene and p-cresol.

3. The product of claim 1, wherein the reactants are p-diisopropenylbenzene and phenol.

4. The product of claim 1, wherein the reactants are m-diisopropenylbenzene and phenol.

5. The product of claim 1, wherein the reactants are p-diisopropenylbenzene and the phenol is a mixture of phenol and 4,4'-isopropylidene diphenol.

6. The method of making a polymeric resin which comprises heat reacting proportions between 0.8–1.25 moles of at least one phenol of the group consisting of phenol, alkylphenols, and bis-phenols having at least two available reaction sites per molecule wherein alkyl is inclusive of 1 to 4 carbon alkyl groups and 1 mole of a diisopropenylbenzene of the group consisting of meta, para and mixed meta and para isomers thereof in admixture with an acid-reacting alkylation catalyst at a reaction temperature between about 60° and about 125° C.

References Cited in the file of this patent

UNITED STATES PATENTS 2,224,837    Rosenthal    Dec. 10, 1940